United States Patent [19]

Turner

[11] Patent Number: 4,953,624
[45] Date of Patent: Sep. 4, 1990

[54] CYLINDER PRESSURE SWITCH FOR AUTOMATIC FIRE PROTECTION SYSTEMS

[75] Inventor: Mark L. Turner, Grand Rapids, Mich.

[73] Assignee: Convenience Marine Products, Inc., Grand Rapids, Mich.

[21] Appl. No.: 380,855

[22] Filed: Jul. 17, 1989

[51] Int. Cl.⁵ .............................................. A62C 37/22
[52] U.S. Cl. ........................................ 169/60; 169/71; 169/37
[58] Field of Search .................. 169/54, 56, 60, 61, 169/19, 23, 37, 90, 20, 71

[56] References Cited

U.S. PATENT DOCUMENTS

| | | | |
|---|---|---|---|
| 2,166,264 | 7/1939 | Piper | 169/23 |
| 2,351,082 | 6/1944 | Tyden | 169/23 |
| 3,064,739 | 11/1962 | Hanson et al. | |
| 3,747,557 | 7/1973 | Bayly et al. | 169/23 |
| 3,824,374 | 7/1974 | Mayher | |
| 3,915,236 | 10/1975 | Stichling | 169/61 |
| 3,967,255 | 6/1976 | Oliver et al. | 169/61 |
| 4,499,952 | 2/1985 | Spector et al. | 169/61 |
| 4,506,737 | 3/1985 | Pare | 169/37 |
| 4,618,001 | 10/1986 | Hoening | 169/23 |
| 4,648,460 | 3/1987 | McCulloch | 169/57 |
| 4,887,674 | 12/1989 | Galosky et al. | 169/61 |

OTHER PUBLICATIONS

Fireboy "Fact Finder".

Primary Examiner—Sherman Basinger
Assistant Examiner—Stephen P. Avila
Attorney, Agent, or Firm—Price, Heneveld, Cooper, DeWitt & Litton

[57] ABSTRACT

A self-contained fire protection system for an engine compartment and the like includes a gas cylinder or bottle having an outlet and a manifold secured to the cylinder. The manifold defines a through passage. Secured to the manifold is a thermally responsive actuator. The actuator includes a cap which is released in a fire condition permitting the contents of the cylinder to be discharged. A pressure switch having a pressure sensing port is mounted on the manifold. A switch activation accelerator includes an elongated stand pipe or tube extending from the pressure sensing port. The tube moves the effective position of the sensing port to an ambient pressure location.

18 Claims, 1 Drawing Sheet

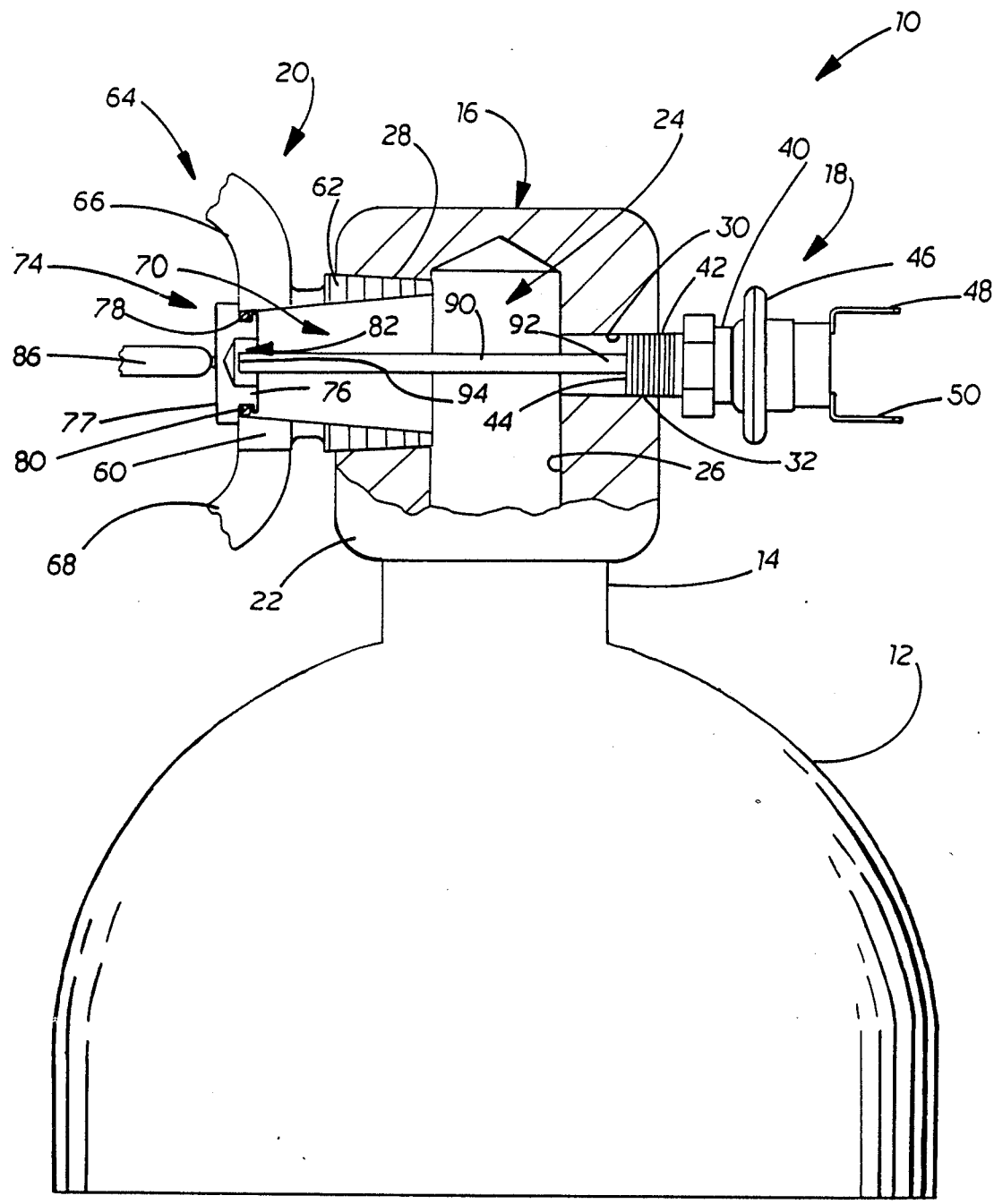

CYLINDER PRESSURE SWITCH FOR AUTOMATIC FIRE PROTECTION SYSTEMS

BACKGROUND OF THE INVENTION

The present invention relates to self-contained, automatic fire protection systems and more particularly systems adapted for use in engine compartments of marine craft and the like.

Fire protection systems are commonly used in the engine compartments of marine craft. Such systems automatically actuate to extinguish an engine compartment fire. Typical systems include a pressure vessel, cylinder or bottle filled with a extinguishing material or agent. A typical agent is Halon 1301 which is manufactured by E. I. DuPont de Nemours. The extinguishing agent is stored under pressure in a liquid state within the pressure vessel. A pressurizing gas such as nitrogen may also be contained within the bottle. The system includes an actuator which includes a nozzle and a thermally responsive trigger. When a predetermined temperature is reached, the trigger releases and the agent is discharged.

Prior fire extinguishing systems may also include a pressure switch used to initiate an engine shutdown sequence. Initiating engine shutdown is particularly important when the marine craft employs diesel engines. Upon discharge of the Halon agent from the fire extinguishing system, the engine's normal aspiration of air from its enclosure or engine room lowers the concentration of the agent. This may prevent full extinguishment or result in a reflash of the fire. In addition, aspiration of the Halon agent into the engine creates Halon breakdown products. The breakdown products result when the agent is aspirated into a diesel, as opposed to a gasoline internal combustion engine, due to the higher combustion pressures and temperatures present. Gasoline engines are stopped immediately upon reaching a 5% concentration of Halon 1301 agent. A diesel engine, however, may require in excess of a 30% Halon 1301 concentration to stop without external shutdown procedures. When Halon 1301 agent is allowed to break down into its components inside an operating diesel engine, the exhaust from the engine will contain hydrogen fluoride and hydrogen bromide in potentially toxic quantities. Failure to initiate immediate engine shutdown may create the potential, therefore, for a reflash of the fire and a health hazard due to the release of toxic breakdown products.

Responsiveness problems are experienced with present engine shutdown systems in a Halon 1301 fire extinguisher. The pressure switches operate based upon a decrease in pressure within the fire extinguishing system. The Halon agent is a liquified, compressed gas, its discharge pressure curve is fairly constant until substantially the entire agent has been discharged from the bottle or cylinder. In some systems, engine shutdown may not be initiated until up to eight seconds after actuation of the automatic fire protection system. A need exists, therefore, for a self-contained fire protection system and/or pressure switch arrangement which provides faster response times.

SUMMARY OF THE INVENTION

In accordance with the present invention, the aforementioned need is fulfilled. Essentially, a manifold is provided having an inlet, an outlet and a switch passage. A thermally responsive actuator is supported on the manifold at the outlet. A pressure switch is mounted at the switch passage. Provision is made for accelerating switch actuation or response time upon release of the thermally responsive actuator.

BRIEF DESCRIPTION OF THE DRAWING

The single drawing is a fragmentary, partially sectioned, side elevational view of a self-contained fire protection system in accordance with the present invention.

DETAILED DESCRIPTION OF THE PREFERRED EMBODIMENT

A preferred embodiment of a fire protection system in accordance with the present invention is illustrated in the single drawing and designated by the numeral 10. System 10 includes a pressure vessel, gas bottle or cylinder 12 having a outlet neck 14. A manifold 16 is threadably attached to outlet neck 14 in a conventional fashion. An electrical pressure switch 18 and a thermally responsive actuator or head 20 are mounted on manifold 16.

Manifold 16 includes a body 22 defining a passage 24. Passage 24 includes an inlet portion 26 and an outlet portion 28. Portion 28 is internally threaded. Coaxially aligned with portion 28 is a switch passage 30. An outer portion 32 of passage 30 is internally threaded. Passage 24, therefore, has a generally right angle or L-shape and portions 26, 28 and 30 communicate with each other.

Switch 18 is a conventional, commercially available device. In the form illustrated, switch 18 includes a body 40 having a threaded portion 42. Portion 42 is threaded within switch passage 30. Portion 42 defines a sensing port 44. Mounted on body 40 is a diaphragm housing 46 and electrical connectors 48, 50. Switch 18 senses activation of the fire protection system. A release of pressure sensed at port 44 actuates switch 18. Connectors 48, 50 are wired to a conventional engine shutdown system. When actuated, an engine shutdown sequence is initiated.

Head 20 includes a body 60. Body 60 defines an orifice or nozzle portion 62 and a frame 64 having arms 66, 68. Nozzle portion 62 defines an actuator orifice 70. Actuator orifice 70 is closed by a plug or cap 74. Cap 74 includes a hub-like portion 76 and a horizontal disc portion 77. Portion 76 defines an external groove 78 which receives an O-ring 80. Hub-like portion 76 also defines a generally cup-shaped recess 82. Recess 82 is coaxial with passage 28, the actuator orifice and switch passage 30.

In a conventional fashion, cap 74 is held in the closed position by a thermally responsive trigger schematically shown and designated by the numeral 86. For the sake of simplicity, only a portion of the actuator or head 20 is illustrated since it is a conventional item. The actuator may be of the type generally disclosed in U.S. Pat. No. 4,167,974, entitled SPRINKLER and issued on Sept. 18, 1979 to Job or U.S. Pat. No. 4,570,720, entitled SPRINKLER HEAD and issued on Feb. 18, 1986 to Retzloff et al. The thermally responsive triggering element 86 may be a fusible link or a glass bulb. When a predetermined temperature is reached, triggering element 86 releases cap 74. The pressure within cylinder 12 will then blow or throw cap 74 away from the actuator orifice. This releases the fire extinguishing agent contained within the bottle 12.

In present systems, the pressure sensing port of the switch is located upstream of ambient pressure. Ambient pressure is present, of course, at the actuator cap outside of the actuator orifice. The agent, being a liquified compressed gas, has a discharge pressure curve which is fairly constant until the loading ratio, that is, the ratio of liquid to volume in pounds per cubic feet of cylinder volume, falls to approximately 7.4 pounds per cubic foot. At an initial load ratio, for example, of 70 pounds per cubic foot, approximately 90% of available extinguishing agent needs to be discharged before the pressure switch is actuated and a shutdown sequence initiated.

In accordance with the present invention, means are provided for physically moving the switch pressure sensing port to an ambient pressure location downstream from the actuator orifice. As shown, an elongated Pitot tube or switch stand pipe 90 extends from pressure sensing port 44 of switch 18. Stand pipe 90 is inserted at an end 92 within body portion 42. Tube 90 has a free end 94. End 94 extends into recess 82 of cap 74. As a result, the end of tube 90 is positioned at an ambient pressure location downstream of the actuator orifice. Tube 90, in effect, moves the pressure sensing port of switch 18 to an ambient position. Forming the recess 82 within the cap permits positioning of the free end of the tube further downstream to such an ambient pressure location.

In operation, cylinder 12 is filled with the extinguishing agent. In a conventional fashion, manifold 16 includes means for filling the cylinder. The fire extinguishing system 10 is mounted within an engine compartment of a marine craft, for example. The pressure of the gas within cylinder 12 fills the manifold passage 24 and through tube 90 maintains switch 18 in an open or unactuated condition. Upon reaching a predetermined temperature in a fire condition, actuator 20 releases cap 74. Upon release of the cap, open end 94 of tube 90 is exposed to ambient pressure. The extinguishing agent is discharged from cylinder 12 and flows around the actuator tube 90. Switch 18 is actuated which results in initiation of engine shutdown procedures by an engine shutdown system connected to switch 18 at connectors 48, 50.

In a presently existing embodiment, initiation of the shutdown sequence has been accelerated to the order of 0.2 seconds when measured from cap release to switch actuation from approximately 8 seconds. The present invention provides, therefore, a significant improvement over prior systems. The present invention eliminates or minimizes the loss of the extinguishing agent heretofore experienced due to engine aspiration. Fire reflash potential is substantially reduced. In addition, health hazard potential due to creation of agent breakdown products is eliminated or significantly reduced.

In view of the above description, those of ordinary skill in the art may envision various modifications which would not depart from the inventive concepts disclosed herein. The above description, therefore, should be considered as only that of the preferred embodiment. The true spirit and scope of the present invention may be determined by reference to the appended claims.

The embodiments of the invention in which an exclusive property or privilege is claimed are defined as follows.

1. A fire extinguisher for an engine compartment or the like, said extinguisher including:

a pressure vessel having an outlet;
a manifold secured to said vessel, said manifold defining a passage having an inlet aligned with said vessel outlet and a manifold outlet, said manifold further defining a switch passage communicating with said passage outlet;
a head having a body defining a nozzle, a frame, a cap disposed within said nozzle and a thermally responsive trigger engaging said cap;
a pressure switch disposed within said switch passage said switch being actuated by a reduction in pressure; and
accelerator means operatively connected to said pressure switch for accelerating switch actuation upon release of said cap.

2. A fire extinguisher as defined by claim 1 wherein said pressure switch includes a pressure sensing port.

3. A fire extinguisher as defined by claim 2 wherein said accelerator means comprises an elongated tube having an end disposed within said pressure sensing port and an open end adjacent said sprinkler head cap.

4. A fire extinguisher as defined by claim 3 wherein said pressure switch is a diaphragm switch.

5. A fire extinguisher as defined by claim 3 wherein said sprinkler head ca includes a hub portion defining a cup-shaped recess opening into said manifold passage, said open end of said tube being disposed within said recess.

6. An actuator for a fire extinguishing system of the type using a compressed gas bottle and adapted for use in an engine compartment, said actuator comprising:

a manifold defining an inlet, an outlet and a pressure switch passage;
a cap disposed within said outlet; thermally responsive means engaging said cap for releasing said cap when a predetermined ambient temperature is reached;
a pressure switch on said manifold and having a sensing port opening into said switch passage, said switch being actuated upon a decrease in pressure; and
switch actuation accelerator means connected to said sensing port for accelerating actuation of said switch upon a release of said cap.

7. An actuator as defined by claim 6 wherein said accelerator means comprises:

a tube having an end connected to said sensing port and a free end at said manifold outlet.

8. An actuator as defined by claim 7 wherein said tube defines a recess opening into said manifold, said tube free end being disposed within said recess.

9. An actuator as defined by claim 8 wherein said switch passage is coaxial with said manifold outlet.

10. An actuator as defined by claim 9 wherein said tube is an elongated, straight member extending along a center axis of said manifold outlet.

11. A device for releasing a fire extinguishing agent in the event of a fire, said device comprising:

a manifold defining a through passage having an outlet and an inlet;
a thermally responsive actuator on said manifold, said actuator including a cap normally sealing said manifold outlet;
pressure sensing means for sensing a reduction of pressure upon a release of said cap, said sensing means including a pressure sensing port; and
accelerator means connected to said pressure sensing port and extending within said manifold passage for effectively moving the pressure sensing port to a position where it is exposed to ambient pressure upon release of said cap.

12. A device as defined by claim 11 wherein said thermally responsive actuator includes a body defining a nozzle disposed within said manifold outlet, said cap sealing said nozzle.

13. A device as defined by claim 12 wherein said cap includes a hub portion, said hub portion defining a recess.

14. A device as defined by claim 13 wherein said accelerator means comprises:
an elongated tube, said tube having an end at said sensing port and a free end disposed within said recess of said cap hub portion.

15. A device as defined by claim 14 wherein said manifold further defines a switch passage communicating with said through passage.

16. A device as defined by claim 15 wherein said pressure sensing means is mounted on said manifold at said switch passage.

17. A device as defined by claim 16 wherein said switch passage is coaxially aligned with said manifold outlet.

18. A device as defined by claim 17 wherein said pressure sensing means is a diaphragm switch.

* * * * *